United States Patent
Chen et al.

(10) Patent No.: US 10,949,223 B2
(45) Date of Patent: Mar. 16, 2021

(54) INTERFACE GENERATION METHOD, APPARATUS, AND SYSTEM

(71) Applicant: HUAWEI TECHNOLOGIES CO., LTD., Guangdong (CN)

(72) Inventors: Yixin Chen, Shenzhen (CN); Li Chen, Nanjing (CN); Jin Qin, Shenzhen (CN); Yu Pan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/176,685

(22) Filed: Oct. 31, 2018

(65) Prior Publication Data

US 2019/0065220 A1 Feb. 28, 2019

Related U.S. Application Data

(63) Continuation of application No. PCT/CN2017/085491, filed on May 23, 2017.

(30) Foreign Application Priority Data

Jun. 30, 2016 (CN) .......................... 201610512422.6

(51) Int. Cl.
*G06F 40/279* (2020.01)
*G06F 3/0482* (2013.01)
(Continued)

(52) U.S. Cl.
CPC ............ *G06F 9/451* (2018.02); *G06F 3/0482* (2013.01); *G06F 40/221* (2020.01); *G06F 40/279* (2020.01)

(58) Field of Classification Search
CPC .... G06F 9/451; G06F 17/272; G06F 17/2765; G06F 3/0482
See application file for complete search history.

(56) References Cited

U.S. PATENT DOCUMENTS

| 7,761,842 B2 | 7/2010 | Udler |
| 2003/0046061 A1* | 3/2003 | Preston .................. G06F 8/436 704/9 |

(Continued)

FOREIGN PATENT DOCUMENTS

| CN | 101685393 A | 3/2010 |
| CN | 101833458 A | 9/2010 |

(Continued)

OTHER PUBLICATIONS

Chinese Office Action issued in Chinese Application No. 201610512422.6 dated Dec. 24, 2018, 7 pages.

(Continued)

*Primary Examiner* — Jennifer N To
*Assistant Examiner* — Amy P Hoang
(74) *Attorney, Agent, or Firm* — Fish & Richardson P.C.

(57) ABSTRACT

The present disclosure relates to an interface generation method. In one example method, an interface generation apparatus obtains a service requirement of a user. The interface generation apparatus determines, based on the service requirement of the user, interface elements for implementing the service requirement and an association relationship between the interface elements for implementing the service requirement. The interface generation apparatus generates a user interface based on the interface elements for implementing the service requirement and the association relationship between the interface elements for implementing the service requirement.

14 Claims, 6 Drawing Sheets

(51) Int. Cl.
*G06F 9/451* (2018.01)
*G06F 40/221* (2020.01)

(56) References Cited

U.S. PATENT DOCUMENTS

| | | | |
|---|---|---|---|
| 2006/0206804 | A1 | 9/2006 | Barnett |
| 2014/0075336 | A1 | 3/2014 | Curtis et al. |
| 2014/0365895 | A1* | 12/2014 | Magahern ............... G06F 3/016 715/727 |
| 2015/0007067 | A1* | 1/2015 | Kang ........................ G06F 8/38 715/762 |
| 2015/0067640 | A1 | 3/2015 | Booker et al. |
| 2015/0293673 | A1* | 10/2015 | Peters ...................... G06F 8/38 715/763 |
| 2015/0346986 | A1* | 12/2015 | Prodhomme ....... G06F 3/04847 715/763 |
| 2017/0193397 | A1* | 7/2017 | Kottha ................ G06F 17/2785 |
| 2018/0143811 | A1* | 5/2018 | Syed ........................ G06F 8/35 |

FOREIGN PATENT DOCUMENTS

| | | |
|---|---|---|
| CN | 102360296 A | 2/2012 |
| CN | 102541541 A | 7/2012 |
| CN | 102043582 B | 12/2012 |
| CN | 102981855 A | 3/2013 |
| CN | 105022615 A | 11/2015 |
| CN | 106155686 A | 11/2016 |
| GB | 2482546 A | 2/2012 |

OTHER PUBLICATIONS

Chinese Search Report issued in Chinese Application No. 2016105124226 dated Dec. 12, 2018, 2 pages.
International Search Report and Written Opinion issued in International Application No. PCT/CN2017/085491 dated Aug. 9, 2017, 15 pages.
Bhargaua A et al:"Easy contextual intent prediction and slot detection", International Workshop on Acoustic Signal Enhancement 2012, Institute of Electrical and Electronics Engineers, Piscataway, NJ, US, May 26, 2013, pp. 8337-8341, XP032508884.
Extended European Search Report issued in European Application No. 17818995.7 dated Feb. 18, 2019, 11 pages.
Shengtao Sun, "The Semantic Ontology Technology in Spatial Information Retrieval System," dated May 2016, 8 pages (with partial English translation).
Office Action issued in Chinese Application No. 201610512422.6 dated Jul. 3, 2019, 9 pages.

* cited by examiner

Card reissue type

Type options  ○ Normal card  ○ Value-added service card

Old card information

Old card type [v]   Old card number [ ]   Telephone number [ ]

Card reissue information

Reason for card reissue [ ]   Remarks [ ]

Incompatible ⌄
Incompatible
Others
Missing
Damaged

INTERFACE GENERATION METHOD, APPARATUS, AND SYSTEM

CROSS-REFERENCE TO RELATED APPLICATIONS

This application is a continuation of International Patent Application No. PCT/CN2017/085491 filed on May 23, 2017, which claims priority to Chinese Patent Application No. 201610512422.6 filed on Jun. 30, 2016. The disclosures of the aforementioned applications are hereby incorporated by reference in their entireties.

TECHNICAL FIELD

This application relates to the field of information technologies, and more specifically, to an interface generation method, apparatus, and system.

BACKGROUND

During implementation of an interface, the interface may first be designed based on a service requirement. This includes drawing interface layout and specific controls included, and specifying a service requirement function corresponding to each UI control.

After the interface layout is drawn, a development tool may be used to implement the designed interface through code development. Once the development is complete, the interface layout and represented service meanings are fixed, and cannot be changed based on a real-time service requirement of a user. Therefore, flexibility of interface generation is not high, and consequently the interface is limited in use.

SUMMARY

Embodiments of this application provide an interface generation method, apparatus, and system, to implement on-demand generation of a user interface matching a service requirement. This implements flexible user interface generation, allowing a user to use a user interface corresponding to a user requirement, and overcoming use limitation of a fixed interface.

According to a first aspect, an interface generation method is provided, including:
  obtaining, by an interface generation apparatus, a service requirement of a user;
  determining, by the interface generation apparatus based on the service requirement of the user, interface elements for implementing the service requirement and an association relationship between the interface elements for implementing the service requirement; and
  generating, by the interface generation apparatus, a user interface based on the interface elements for implementing the service requirement and the association relationship between the interface elements for implementing the service requirement.

Therefore, in this embodiment of this application, the interface generation apparatus may determine, based on the service requirement of the user, the interface elements for implementing the service requirement and the association relationship between the interface elements for implementing the service requirement; and generate the user interface based on the interface elements for implementing the service requirement and the association relationship between the interface elements for implementing the service requirement. In this way, the interface generation apparatus can generate, on demand, a user interface matching a service requirement. This implements flexible user interface generation, allowing a user to use a user interface corresponding to a user requirement, and overcoming use limitation of a fixed interface.

With reference to the first aspect, in a first possible implementation of the first aspect, the interface elements for implementing the service requirement include a UI control for implementing the service requirement and a service logic for implementing the service requirement, and the association relationship between the interface elements for implementing the service requirement includes that each UI control for implementing the service requirement is associated with at least one service logic for implementing the service requirement; or
  the interface elements for implementing the service requirement include a display unit for implementing the service requirement, a UI control for implementing the service requirement, and a service logic for implementing the service requirement, and the association relationship between the interface elements for implementing the service requirement includes that each display unit for implementing the service requirement is associated with at least one UI control for implementing the service requirement, and that each UI control for implementing the service requirement is associated with at least one service logic for implementing the service requirement.

The user interface may include at least one display unit, and each display unit may include at least one UI control. That is, a UI control may be presented in a display unit. Alternatively, display unit division may not be performed on the user interface. That is, the user interface includes at least one control. The UI control may be a UI control having no service semantics or a UI control having semantics. The service logic may be used to process entered by the user for the UI control.

With reference to any one of the first aspect or the foregoing possible implementation of the first aspect, in a second possible implementation of the first aspect, the generating a user interface includes:
  obtaining implementation code of the interface elements for implementing the service requirement from an interface element code library; and
  generating the user interface based on the implementation code of the interface elements for implementing the service requirement and the association relationship between the interface elements for implementing the service requirement.

Therefore, after the interface elements for determining the service requirement of the user are determined, the implementation code of the interface elements is obtained from the interface element code library. In this way, when a service requirement of a user is obtained, a user interface matching the service requirement is generated automatically. There is no need to develop or edit interface-level implementation code manually using a development tool.

With reference to any one of the first aspect or the foregoing possible implementations of the first aspect, in a third possible implementation of the first aspect, the method further includes: obtaining, by the interface generation apparatus, an interface generation template from a template library, where the interface generation template includes a background area and a blank area; and
  the generating a user interface includes:
  writing, into the blank area of the interface generation template, the implementation code of the interface elements for implementing the service requirement and the association relationship between the interface elements for implementing the service requirement, to generate the user interface.

With reference to any one of the first aspect or the foregoing possible implementations of the first aspect, in a fourth possible implementation of the first aspect, the determining interface elements for implementing the service requirement and an association relationship between the interface elements for implementing the service requirement includes:

determining, based on the service requirement of the user and a multi-level correspondence between a service requirement and at least two interface elements, the interface elements for implementing the service requirement from the at least two interface elements and the association relationship between the interface elements for implementing the service requirement.

Therefore, the interface elements for implementing the service requirement of the user and the association relationship between the interface elements are determined based on the multi-level correspondence between a user service requirement and interface elements. In this way, when a service requirement of a user is obtained, a user interface matching the service requirement is generated automatically. There is no need to develop or edit interface-level implementation code manually using a development tool.

With reference to any one of the first aspect or the foregoing possible implementations of the first aspect, in a fifth possible implementation of the first aspect, the determining the interface elements for implementing the service requirement from the at least two interface elements includes:

determining, as an interface element for implementing the service requirement, an interface element that matches environment information of the user among interface elements indicated by the multi-level correspondence.

With reference to any one of the first aspect or the foregoing possible implementations of the first aspect, in a sixth possible implementation of the first aspect, the environment information of the user includes at least one of terminal device information, operator information, and user information of the user.

The operator information may be but is not limited to an identifier, a name, and a business scope of an operator. The terminal device information may be but is not limited to a unique terminal device identifier of a terminal device used to identify the terminal device, or a model of a terminal device. The user information may be but is not limited to an age, a gender, a preference, or the like of a user.

Therefore, in this embodiment of this application, a user interface matching environment information of a user and a service requirement of the user may be generated based on the environment information and the service requirement of the user. This further improves user interface flexibility and enhances user experience.

With reference to any one of the first aspect or the foregoing possible implementations of the first aspect, in a seventh possible implementation of the first aspect, the multi-level correspondence includes:

a service requirement-UI control correspondence and a UI control-service logic correspondence; or a service requirement-display unit correspondence, a display unit-UI control correspondence, and a UI control-service logic correspondence.

With reference to any one of the first aspect or the foregoing possible implementations of the first aspect, in an eighth possible implementation of the first aspect, before the determining, by the interface generation apparatus, the interface elements for implementing the service requirement from the at least two interface elements and the association relationship between the interface elements for implementing the service requirement, the method further includes:

determining, by a correspondence generation apparatus, sample data, where the sample data includes a plurality of service requirements, a plurality of interface elements, relationship data between each of the plurality of service requirements and at least one of the plurality of interface elements, and relationship data between the plurality of interface elements; and generating, based on the sample data, the multi-level correspondence through training.

With reference to any one of the first aspect or the foregoing possible implementations of the first aspect, in a ninth possible implementation of the first aspect, the determining, by a correspondence generation apparatus, sample data includes:

parsing and analyzing Hypertext Markup Language HTML statements of user interfaces of a plurality of web pages to determine the sample data; and/or determining the sample data based on an operation log of a service staff member.

With reference to any one of the first aspect or the foregoing possible implementations of the first aspect, in a tenth possible implementation of the first aspect, the obtaining, by an interface generation apparatus, a service requirement of a user includes:

obtaining a service description entered by the user;

performing natural language analysis or statement similarity computation on the service description to obtain a keyword; and searching a service requirement library based on the keyword to obtain the service requirement of the user.

According to a second aspect, an interface generation apparatus is provided, capable of performing the operations performed by the interface generation apparatus in any one of the first aspect or the possible implementations of the first aspect. Specifically, the interface generation apparatus may include a modular unit configured to perform the operations performed by the interface generation apparatus in any one of the first aspect or the possible implementations of the first aspect.

According to a third aspect, an interface generation apparatus is provided, including a memory and a processor, where the memory is configured to store an instruction, the processor is configured to execute the instruction stored by the memory, and when the processor executes the instruction stored by the memory, this execution causes the processor to perform the corresponding operations of the interface generation apparatus in any one of the first aspect or the possible implementations of the first aspect.

According to a fourth aspect, a computer storage medium is provided, where the computer storage medium stores program code, and the program code is used to instruct that the operations performed by the interface generation apparatus in any one of the first aspect or the possible implementations of the first aspect be performed.

According to a fifth aspect, a correspondence generation apparatus is provided, capable of performing the operations performed by the correspondence generation apparatus in any one of the first aspect or the possible implementations of the first aspect. Specifically, the correspondence generation apparatus may include a modular unit configured to perform the operations performed by the correspondence generation apparatus in any one of the first aspect or the possible implementations of the first aspect.

According to a sixth aspect, a correspondence generation apparatus is provided, including a memory and a processor, where the memory is configured to store an instruction, the processor is configured to execute the instruction stored by the memory, and when the processor executes the instruction stored by the memory, this execution causes the processor to perform the corresponding operations of the correspondence generation apparatus in any one of the first aspect or the possible implementations of the first aspect.

According to a seventh aspect, a computer storage medium is provided, where the computer storage medium stores program code, and the program code is used to instruct that the operations of the correspondence generation apparatus in any one of the first aspect or the possible implementations of the first aspect be performed.

According to an eighth aspect, an interface generation system is provided, including the interface generation apparatus in the second or the third aspect and the correspondence generation apparatus in the fifth or the sixth aspect.

BRIEF DESCRIPTION OF DRAWINGS

To describe the technical solutions in the embodiments of this application more clearly, the following briefly describes the accompanying drawings for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

An interface generation method, apparatus, and system that are provided in the embodiments of this application may be applied to a computer. The computer includes a hardware layer, an operating system layer running on the hardware layer, and an application layer running on the operating system layer. The hardware layer includes hardware such as a CPU (Central Processing Unit), a memory management unit (MMU), and a memory (also referred to as a main memory). The operating system may be one or more types of computer operating systems, such as a Linux operating system, a Unix operating system, an Android operating system, an iOS operating system, or a Windows operating system, that implement service processing by using a process. The application layer includes applications such as a browser, a contact list, text processing software, and instant communications software. In addition, in the embodiments of this application, the computer may be a device that can run a program that records code for implementing the interface generation method in the embodiments of this application, to generate an interface according to the interface generation method in the embodiments of this application. The interface generation method in the embodiments of this application may be executed by a computer device or a function module that is in a computer device and that can call and execute a program.

Figure 1:
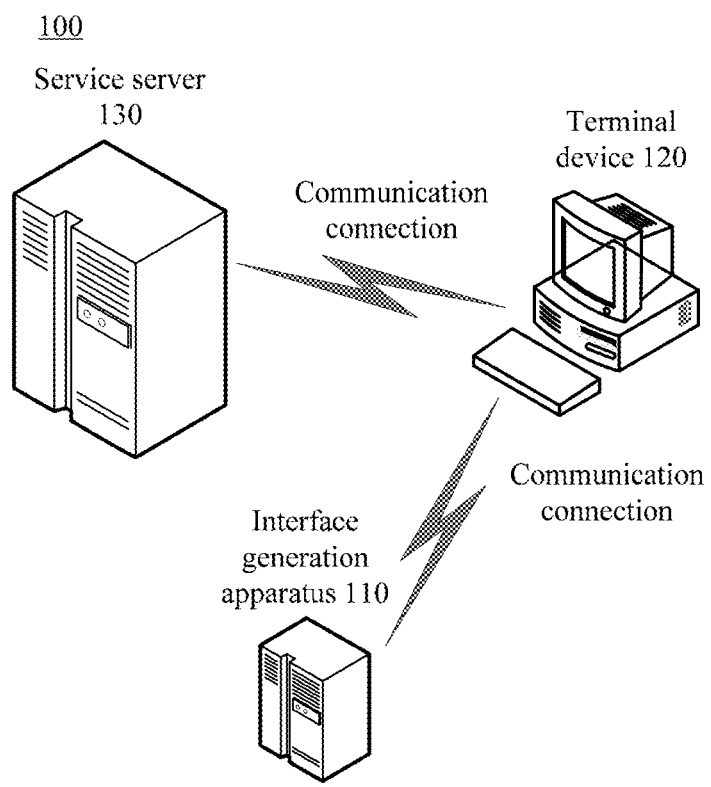
FIG. 1 is a schematic diagram of an application system according to an embodiment of this application.

FIG. 1 is a diagram of an application system according to an embodiment of this application. As shown in FIG. 1, the system 100 includes an interface generation apparatus 110, a terminal device 120, and a service server 130.

The interface generation apparatus 110 may generate a user interface based on a service requirement of a user.

The terminal device 120 may present the generated user interface at the terminal device. Before presenting the user interface, the terminal device 120 needs to parse the generated user interface to generate a document object model (DOM) tree or a render tree.

The service server 130 may provide a service to the terminal device.

It should be understood that, though the interface generation apparatus 110 shown in FIG. 1 is independent of the terminal device 120 and the service server 130, this embodiment of this application is not limited thereto. For example, the interface generation apparatus 110 may be integrated into the terminal device 120, or the interface generation apparatus 110 may be integrated into the service server 130.

It should be understood that, the application system shown in FIG. 1 is merely an application scenario of this embodiment of this application, and does not constitute any limitation on this embodiment of this application. Specifically, the system 100 may also include another device.

In an optional implementation, the system 100 may also include a correspondence generation apparatus. The correspondence generation apparatus is configured to generate a multi-level correspondence between a service requirement and at least two interface elements.

The correspondence generation apparatus may be independent of the terminal device 120 and the service server 130, or may be integrated into the terminal device 120 or the service server 130.

In another optional implementation, the system 100 may also include a storage device. The storage device may store the foregoing multi-level correspondence or may store a code library, such as a user interface (UI) control (Component) code library, a display unit code library, a service logic code library, or a template library for use by the interface generation apparatus during interface generation. In this way, when needing to generate a user interface, the interface generation apparatus may obtain implementation code of a UI control, implementation code of a display unit, a template, or the like from the storage device, and thereby generating the user interface.

The storage device may be independent of the terminal device 120 and the service server 130, or may be integrated into the terminal device 120 or the service server 130.

The storage device configured to store the multi-level correspondence and the storage device configured to store a code library that are mentioned in this embodiment of this application may be one device or different devices.

Figure 2:
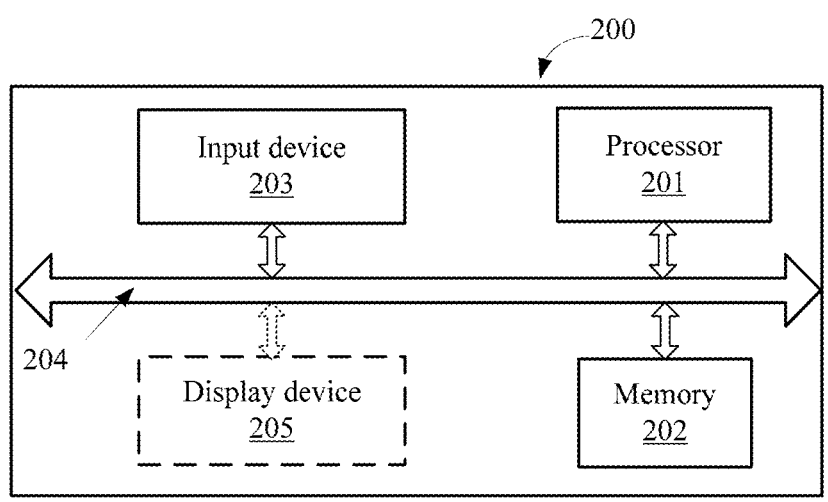
FIG. 2 is a schematic block diagram of an interface generation apparatus according to an embodiment of this application.

FIG. 2 is a schematic structural diagram of an interface generation apparatus 200 according to an embodiment of this application. Optionally, the interface generation apparatus 200 may be the interface generation apparatus 110 shown in FIG. 1.

As shown in FIG. 2, the interface generation apparatus 200 may include a processor 201, a memory 202, an input device 203, and a bus system 204.

The memory 202 may include a read-only memory and a random access memory, and provides an instruction and data to the processor 201. A part of the memory 202 may further include a non-volatile random access memory (NVRAM).

The processor 201 controls an operation of the interface generation apparatus 200. The processor 201 may also be referred to as a central processing unit (CPU). The memory 202 may include a read-only memory and a random access memory, and provides an instruction and data to the processor 201. A part of the memory 202 may further include a non-volatile random access memory (NVRAM). In actual application, components of the interface generation apparatus 200 are coupled together by the bus system 204. In addition to a data bus, the bus system 204 may also include a power bus, a control bus, a status signal bus, and the like. However, for clarity, various types of buses are all marked as the bus system 204.

In this embodiment of this application, the processor 201 calls an operation instruction stored in the memory 202, so that the interface generation apparatus executes a corresponding procedure of the interface generation method in the embodiments of this application. For details, refer to related descriptions about the following interface generation method 300 in FIG. 4. To avoid repetition, details are not described now.

The interface generation method 300 disclosed in the following embodiment of this application may be applied to the processor 201 or may be implemented by the processor 201. The processor 201 may be an integrated circuit chip and is capable of signal processing. In an implementation process, steps of the method may be implemented by an integrated logic circuit of hardware of the processor 201 or an instruction in a software form. The foregoing processor 301 may be a general purpose processor, a digital signal processor (DSP), an application-specific integrated circuit (ASIC), a field programmable gate array (FPGA) or another programmable logic device, a discrete gate or a transistor logic device, or a discrete hardware component, and can implement or perform methods, steps, and logic block diagrams disclosed in the embodiments of this application. The general purpose processor may be a microprocessor or the processor may be any regular processor. Steps of the method disclosed with reference to the embodiments of this application may be performed by a hardware decoding processor or by using a combination of hardware of a decoding processor and a software module. The software module may be located in a mature storage medium in the art, such as a random access memory, a flash memory, a read-only memory, a programmable read-only memory, an electrically erasable programmable read-only memory, or a register. The storage medium is located in the memory 202. The processor 201 reads information in the memory 202, and implements the steps of the method disclosed in the embodiments of this application in combination with hardware of the processor 201.

Optionally, the interface generation apparatus 200 may further include a display device 205, and the display device 205 may include a liquid crystal display, a projector, or the like.

Optionally, the interface generation apparatus 200 may further include a network interface, and the interface generation apparatus 200 may communicate with a service side by using the network interface.

Terms used in the embodiments of this application are described below.

Figures 3A, 3B, 3C:
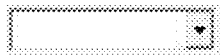
FIG. 3a is a schematic diagram of a user interface according to an embodiment of this application.
FIG. 3b is a schematic diagram of a UI control according to an embodiment of this application.
FIG. 3c is a schematic diagram of a UI control according to an embodiment of this application.

In this embodiment of this application, a user interface may include at least one display unit, and each display unit may include at least one UI control. That is, a UI control may be presented in a display unit. For example, as shown in FIG. 3a, a user interface used for reissuing a telephone card to a user includes a card reissue type display unit, an old card information display unit, and a card reissue information display unit. The card reissue type display unit may include a UI control configured to select a normal card or a value-added service card. The old card information display unit may include a UI control configured to enter an old card type, an old card number, and a telephone number. The card reissue information display unit may include a button configured to enter a reason for card reissue, a UI control used for remarks, and the like.

In this embodiment of this application, alternatively, display unit division may not be performed on the user interface. That is, the user interface includes at least one control.

In this embodiment of this application, the UI control may be visualized as an "element" such as a button or a text edit box on the user interface. When a user provides input for the UI control, a service logic may be triggered.

In this embodiment of this application, as shown in FIG. 3b, the UI control may be a UI control having no service semantics. A UI control having service semantics such as a drop box shown in FIG. 3c is formed by injecting data into a background configuration file.

In this embodiment of this application, the service logic may be used to process entered by a user for a UI control.

In this embodiment of this application, a UI control library includes an identifier (ID) of a control and implementation code of the control, and may further include a function description of the control. The function description may be specifically a natural language description of the UI control, for ease of code modification by a staff member.

In this embodiment of this application, a display unit library may include an ID of a display unit and implementation code of the display unit, and may further include a function description of a control, for ease of code modification by a staff member.

In this embodiment of this application, a service logic library may include an identifier of a service logic and implementation code of the service logic. The service logic may call a service in a background server by using an API.

The service logic library may also include a function description of the service logic, for ease of code modification by a staff member.

Figure 4:
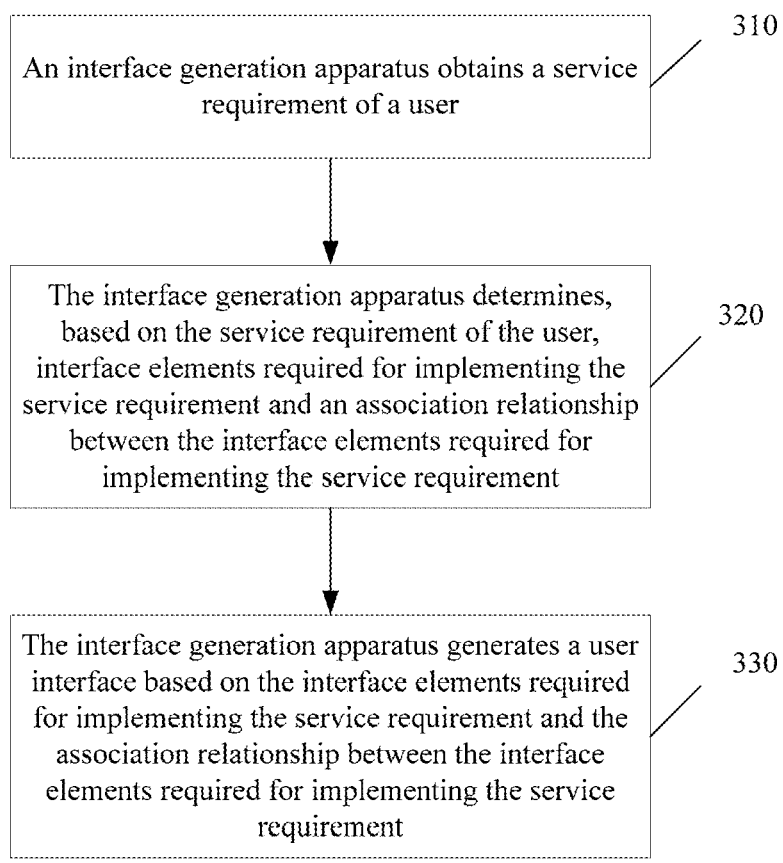
FIG. 4 is a schematic flowchart of an interface generation method according to an embodiment of this application.

FIG. 4 is a schematic flowchart of an interface generation method 300 according to an embodiment of this application. Optionally, the method may be implemented by the interface generation apparatus shown in FIG. 1 or FIG. 2.

As shown in FIG. 4, the method 300 includes step 310, step 320, and step 330.

Step 310. An interface generation apparatus obtains a service requirement of a user.

Optionally, when the interface generation apparatus is integrated into a terminal device, the interface generation apparatus may perform natural language analysis or statement similarity computation based on a service description that is entered by the user by using the terminal device, to obtain the service requirement of the user.

Optionally, when the interface generation apparatus is integrated into a service server, a terminal device may send a service description entered by the user to the interface generation apparatus, and the interface generation apparatus performs natural language analysis or statement similarity computation based on the service description, to obtain the service requirement of the user. Alternatively, a terminal device performs natural language analysis or statement similarity computation based on a service description entered by the user, to obtain the service requirement of the user, and sends the service requirement to the interface generation apparatus.

Optionally, an implementation of obtaining a service requirement from a service description may be: performing natural language analysis or statement similarity computation based on the service description to obtain a keyword, and searching a service requirement library based on the keyword to obtain the service requirement of the user.

In an implementation, text input of the user may be obtained directly, or voice input of the user is obtained and then a text is obtained through voice-text conversion, and the terminal device may perform natural language analysis on the text to obtain a keyword, and search a service requirement library based on the keyword to obtain the service requirement of the user.

For example, after a service requirement of "recharge a long-used phone number to get one phone free for elderly people" or "subscriber registration" is received, natural language analysis may be performed on the service requirement, and a service requirement library (which may be a service process library and is used to provide a process corresponding to a service requirement) is searched for a matching service requirement (for example, "recharge to get one phone free"), a matching combination of a plurality of service requirements (for example, a combination of "recharge to get one phone free", "package change", "value-added package change", and "card reissue"), and/or the like.

Step 320. The interface generation apparatus determines, based on the service requirement of the user, interface elements for implementing the service requirement and an association relationship between the interface elements for implementing the service requirement.

In an implementation, the interface elements for implementing the service requirement include a UI control for implementing the service requirement and a service logic for implementing the service requirement.

Correspondingly, the association relationship between the interface elements for implementing the service requirement includes that each UI control for implementing the service requirement is associated with at least one service logic for implementing the service requirement.

In another implementation, the interface elements for implementing the service requirement include a display unit for implementing the service requirement, a UI control for implementing the service requirement, and a service logic for implementing the service requirement.

Correspondingly, the association relationship between the interface elements for implementing the service requirement includes that each display unit for implementing the service requirement is associated with at least one UI control for implementing the service requirement, and that each UI control for implementing the service requirement is associated with at least one service logic for implementing the service requirement.

Optionally, in this embodiment of this application, the interface generation apparatus may determine, based on a multi-level correspondence between a service requirement and at least two interface elements, the interface elements for implementing the service requirement from the at least two interface elements and the association relationship between the interface elements for implementing the service requirement.

In an implementation, the multi-level correspondence includes a service requirement-UI control correspondence and a UI control-service logic correspondence.

The interface generation apparatus may determine, based on the service requirement of the user and the service requirement-UI control correspondence, a UI control for implementing the service requirement; and determine, based on the UI control for implementing the service requirement and the UI control-service logic correspondence, a service logic for implementing the service requirement.

In another optional implementation, the multi-level correspondence includes a service requirement-display unit correspondence, a display unit-UI control correspondence, and a UI control-service logic correspondence.

For interface generation, a display unit for implementing the service requirement may be determined based on the service requirement of the user and the service requirement-display unit correspondence; a UI control for implementing the service requirement may be determined based on the display unit for implementing the service requirement and the display unit-UI control correspondence; and a service logic for implementing the service requirement may be determined based on the UI control for implementing the service requirement, and the UI control-service logic correspondence.

Optionally, in this embodiment of this application, an interface element that matches environment information of the user among interface elements indicated by the multi-level correspondence may be determined, based on the environment information of the user, as an interface element for implementing the service requirement.

Optionally, the environment information of the user includes at least one of terminal device information, operator information, and user information of the user.

Optionally, the operator information mentioned in this embodiment of this application may be but is not limited to an identifier, a name, and a business scope of an operator. The terminal device information may be but is not limited to a unique terminal device identifier of a terminal device used to identify the terminal device, or a model of a terminal device. The user information may be but is not limited to an age, a gender, a preference, or the like of a user.

In an implementation, assuming that the multi-level correspondence includes a service requirement-UI control correspondence and a UI control-service logic correspondence, a UI control that matches the environment information of the user among UI controls (which are corresponding to the service requirement of the user) indicated by the service requirement-UI control correspondence may be determined as a UI control for implementing the service requirement of the user, and a service logic that matches the environment information of the user among service logics (which are corresponding to the UI control for implementing the service requirement of the user) indicated by the UI control-service logic correspondence may be determined as a service logic for implementing the service requirement of the user.

For example, a service requirement #1 is corresponding to a UI control #1, a UI control #2, a UI control #3, a UI control #4, and a UI control #5, and among the UI controls corresponding to the service requirement #1, UI controls matching an operator A may be the UI control #1, the UI control #2, the UI control #3, and the UI control #4, and UI controls matching an operator B may be the UI control #2, the UI control #3, and the UI control #5.

For example, the UI control #1 is corresponding to a service logic #1, a service logic #2, and a service logic #3, and among the service logics corresponding to the UI control #1, a service logic matching an operator A may be the service logic #1, and service logics matching an operator B may be the service logic #2 and the service logic #3.

In an implementation, assuming that the multi-level correspondence includes a service requirement-display unit correspondence, a display unit-UI control correspondence, and a UI control-service logic correspondence, a display unit that matches the environment information of the user among display units (which are corresponding to the service requirement of the user) indicated by the service requirement-display unit correspondence may be determined as a display unit for implementing the service requirement of the user, a UI control that matches the environment information of the user among UI controls (which are corresponding to the display unit for implementing the service requirement of the user) indicated by the display unit-UI control correspondence may be determined as a UI control for implementing the service requirement of the user, and a service logic that matches the environment information of the user among service logics (which are corresponding to the UI control for implementing the service requirement of the user) indicated by the UI control-service logic correspondence may be determined as a service logic for implementing the service requirement of the user.

For example, a service requirement #1 is corresponding to a display unit #1, a display unit #2, a display unit #3, and a display unit #4, and among the display units corresponding to the service requirement #1, display units matching an operator A may be the display unit #1, the display unit #2, and the display unit #3, and display units matching an operator B may be the display unit #2, the display unit #3, and the display unit #4.

For example, the display unit #1 is corresponding to a UI control #1, a UI control #2, and a UI control #3, and among the UI controls corresponding to the display unit #1, UI controls matching the operator A may be the UI control #1 and the UI control #2, and UI controls matching an operator B may be the UI control #2 and the UI control #3.

For example, the UI control #1 is corresponding to a service logic #1, a service logic #2, and a service logic #3, and among the service logics corresponding to the UI control #1, a service logic matching an operator A may be the service logic #1, and service logics matching an operator B may be the service logic #2 and the service logic #3.

Step 330. The interface generation apparatus generates a user interface based on the interface elements for implementing the service requirement of the user and the association relationship between the interface elements for implementing the service requirement.

Optionally, in this embodiment of this application, the interface generation apparatus may obtain implementation code of the interface elements for implementing the service requirement from an interface element code library. Specifically, the interface generation apparatus may search, based on IDs of the interface elements, the interface element code library for implementation code corresponding to the IDs; and generate the user interface based on the implementation code of the interface elements for implementing the service requirement and the association relationship between the interface elements for implementing the service requirement.

In an implementation, assuming that the interface elements for implementing the service requirement include a UI control for implementing the service requirement and a service logic for implementing the service requirement, implementation code of the UI control for implementing the service requirement may be obtained from a UI control code library, and implementation code of the service logic for implementing the service requirement may be obtained from a service logic code library.

In an implementation, assuming that the interface elements for implementing the service requirement include a display unit for implementing the service requirement, a UI control for implementing the service requirement, and a service logic for implementing the service requirement, implementation code of the display unit for implementing the service requirement may be obtained from a display unit code library, implementation code of the UI control for implementing the service requirement may be obtained from a UI control code library, and implementation code of the service logic for implementing the service requirement may be obtained from a service logic code library.

Optionally, in this embodiment of this application, the interface generation apparatus may obtain an interface generation template from a template library, where the interface generation template includes a background area and a blank area, and write, into the blank area of the interface generation template, the implementation code of the interface elements for implementing the service requirement and the association relationship between the interface elements for implementing the service requirement, to generate the user interface.

Optionally, the background area may include various types of background information. For example, the background area may include style information such as a cartoon, a scenery, or light, or may include operator information or the like.

Optionally, after generating the user interface, the interface generation apparatus may send the generated user interface to a browser module for parsing and presentation. Specifically, a complete HTML web page that satisfies the service requirement and accompanying code may be sent to the browser module for parsing and presentation. The browser module may be located in a terminal device or another device.

Therefore, in this embodiment of this application, the interface generation apparatus may determine, based on the service requirement of the user, the interface elements for implementing the service requirement and the association relationship between the interface elements for implementing the service requirement; and generate the user interface based on the interface elements for implementing the service requirement and the association relationship between the interface elements for implementing the service requirement. In this way, the interface generation apparatus can generate, on demand, a user interface matching a service requirement. This implements flexible user interface generation, allowing a user to use a user interface corresponding to a user requirement, and overcoming use limitation of a fixed interface.

Further, a user interface matching environment information of a user and a service requirement of the user may be generated based on the environment information and the service requirement of the user. This further improves user interface flexibility and enhances user experience.

Further, the interface elements for implementing the service requirement of the user are determined based on the multi-level correspondence between a user service requirement and a user interface, and the implementation code of the interface elements is obtained from the interface element code library. In this way, when a service requirement of a user is obtained, a user interface matching the service requirement is generated automatically. There is no need to develop or edit interface-level implementation code manually using a development tool.

In the foregoing embodiment, the interface generation apparatus may determine the interface elements for implementing the service requirement of the user and the association relationship between the interface elements by using the multi-level correspondence. Before the interface generation apparatus determines the interface elements for implementing the service requirement of the user and the association relationship between the interface elements by using the multi-level correspondence, the correspondence generation apparatus may train the multi-level correspondence.

The following describes how the correspondence generation apparatus trains the multi-level correspondence.

The correspondence generation apparatus may determine sample data, where the sample data includes a plurality of service requirements, a plurality of interface elements, relationship data between each of the plurality of service requirements and at least one of the plurality of interface elements, and relationship data between the plurality of interface elements; and generate, based on the sample data, the multi-level correspondence through training.

In an implementation, the correspondence generation apparatus may parse and analyze HTML statements of user interfaces of a plurality of web pages to determine the sample data; and determine the multi-level correspondence based on the sample data.

For example, a web crawler is used to obtain a web page and identify a service function (service requirement) implemented by the web page, and a web page analysis program is used to parse an HTML statement of a user interface of the web page, to obtain information about a UI control included in the web page, information about a service logic corresponding to the UI control, and the like. After sufficient information is obtained, a service requirement-UI control correspondence and a UI control-service logic correspondence may be established.

For example, a web crawler is used to obtain a web page and identify a service function (service requirement) implemented by the web page, and a web page analysis program is used to parse an HTML statement of a user interface of the web page, to obtain information about a display unit included in the web page, information about a UI control included in the display unit, information about a service logic corresponding to the UI control, and the like. After sufficient information is obtained, a service requirement-display unit correspondence, a display unit-UI control correspondence, and a UI control-service logic correspondence may be established.

In another implementation, the correspondence generation apparatus may determine the sample data based on an operation log of a service staff member.

For example, a log of operating a given UI control (UI control ID collection) on an interface (including service requirement information) by a staff member at a given moment is obtained through dotting in foreground interface code (embedding code for data collection in JavaScript), to obtain relationship data between a service requirement and the UI control. From system log data (a piece of record information is generated during processing of a service function, and a format of the record information may be defined depending on an actual situation), service logic processing performed by a service logic on an event generated by the UI control operation is obtained and an ID of the service logic is identified, so that relationship data between the UI control and the service logic is obtained. After sufficient relationship data is collected, a service requirement-UI control correspondence and a UI control-service logic correspondence may be established.

For example, a log of operating a given UI control (UI control ID collection) of a display unit (the display unit is determined based on a location of a cursor) on an interface (including service requirement information) by a staff member at a given moment is obtained through dotting in foreground interface code (embedding code for data collection in JavaScript), to obtain relationship data between a service requirement and the display unit and relationship data between the display unit and the UI control. From system log data (a piece of record information is generated during processing of a service function, and a format of the record information may be defined depending on an actual situation), service logic processing performed by a service logic on an event generated by the UI control operation is obtained and an ID of the service logic is identified, so that relationship data between the UI control and the service logic is obtained. After sufficient relationship data is collected, a service requirement-display unit correspondence, a display unit-UI control correspondence, and a UI control-service logic correspondence may be established.

Certainly, in this embodiment of this application, the correspondence generation apparatus may determine the sample data by using both a result of HTML statement parsing and analysis on user interfaces of web pages and an operation log of a service staff member.

Optionally, after the sample data is obtained, the multi-level correspondence may be generated through training based on a machine learning algorithm. For example, a service requirement-UI control correspondence and a UI control-service logic association correspondence are generated through training; or a service requirement-display unit correspondence, a display unit-UI control correspondence, and a UI control-service logic correspondence are generated through training.

The machine learning algorithm may be but is not limited to a neural network algorithm, a Monte Carlo algorithm, a statistical algorithm, a Markov algorithm, or the like. Certainly, apart from the machine learning algorithm, the foregoing association correspondences may alternatively be obtained by using another algorithm. This embodiment of this application is not limited in this sense.

Apart from the foregoing manner, the multi-level correspondence may alternatively be obtained in another manner.

In the foregoing manner, relationship data of the multi-level correspondence is obtained by obtaining an operation log of a staff member and parsing and analyzing HTML statements of user interfaces of a plurality of web pages, and then the multi-level correspondence is obtained through training based on a machine learning algorithm.

For example, user requirement-display unit, display unit-UI control, and UI control-service logic relationship data is manually or automatically indicated in a terminal device or a database in a manual or crowdsourcing manner.

For example, a service description document compiled by a designer is obtained. An example of information included in the service description document is as follows: a card reissuing interface includes a card reissue type display unit, an old card information display unit, a new card information display unit, and a card reissue information display unit. There are two options for the card reissue type: normal card and value-added service card. Old card information presents card type data, card number data, a card number group, and telephone number data of an old card. The foregoing information may be directly read from a database table. The foregoing multi-level correspondence is generated based on the designer-compiled service description document.

It should be understood that, the mentioned multi-level correspondence may be implemented in a form of ID lists. For example, the service requirement-display unit correspondence may be a correspondence between a service requirement ID list and a display unit ID list; the display unit-UI control correspondence may be a correspondence between a display unit ID list and a UI control ID list; the UI control-service logic correspondence may be a correspondence between a UI control list and a service logic ID list. Therefore, after a service requirement ID is obtained, a display unit ID may be obtained based on the correspondence between a service requirement ID list and a display unit ID list, a UI control ID may be obtained based on the display unit ID and the correspondence between a display unit ID list and a UI control ID list, and a service logic ID may be obtained based on the UI control ID and the correspondence between a UI control list and a service logic ID list. The mentioned correspondence may alternatively be a functional relationship. For example, after a service requirement ID is entered, a display unit ID may be obtained by using a function.

It should be understood that, the correspondence mentioned in this embodiment of this application may indicate an association probability. For example, a probability that a service requirement #1 is corresponding to a display unit #1 is 100%, a probability that the service requirement #1 is corresponding to a display unit #2 is 80%, and a probability that the service requirement #1 is corresponding to a display unit #3 is 60%. When a display unit is obtained based on the service requirement #1, assuming that a selected template can present only one display unit, the display unit #1 may be selected. If two display units can be presented, the display unit #1 and the display unit #2 may be selected.

It should be further understood that, environment information may be further added to the foregoing trained multi-level correspondence. For example, for a correspondence between As (service requirements or interface elements) and Bs (interface elements), with respect to different environment information, a same A may be corresponding to different Bs.

Figure 5:
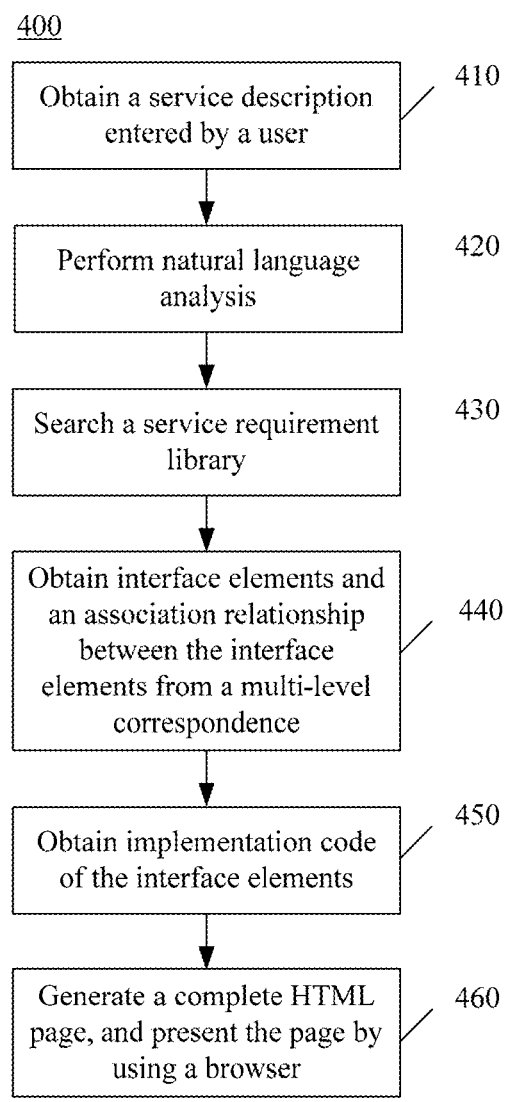
FIG. 5 is a schematic flowchart of an interface generation method according to an embodiment of this application.

FIG. 5 is a schematic flowchart of an interface generation method 400 according to an embodiment of this application. For ease of understanding, FIG. 5 is described with reference to an example in which a service requirement is a mobile communications service requirement and an interface generation apparatus is a terminal device. However, this embodiment of this application is not limited thereto.

Step 410. A user may enter a service description by using a browser, and a terminal device obtains the service description entered by the user. For example, the service description is "recharge to get one phone free for use by elderly people".

Step 420. The terminal device analyzes a characteristic of the entered statement by using a technology such as a natural language processing technology or statement similarity computation. For example, corresponding characters of "recharge to get one phone free for use by elderly people" are "recharge to get one phone free" and "for use by elderly people".

Step 430. The terminal device searches a service requirement library based on the characteristic (keyword) obtained through analysis in step 420, to generate a service requirement sequence. For example, the service requirement sequence is (1) a service of recharge to get one phone free, (2) a package change service, (3) a value-added package, or (4) a card reissue service.

A specific service requirement may be further determined through human-to-human communication. For example, (1) the service of recharge to get one phone free is "recharge for RMB 399 to get RMB 400 and a free model-x mobile phone, (2) the package change service is changing a main package to an xxx package (with 200 minutes call time), (3) the value-added package is determined as no need for a value-added package, and (4) a card needs to be reissued.

Step 440. Search a multi-level correspondence based on the service requirement sequence, to obtain interface elements, for example, ID lists of display units, UI controls, and service logics that match the service requirement sequence.

Figure 6:
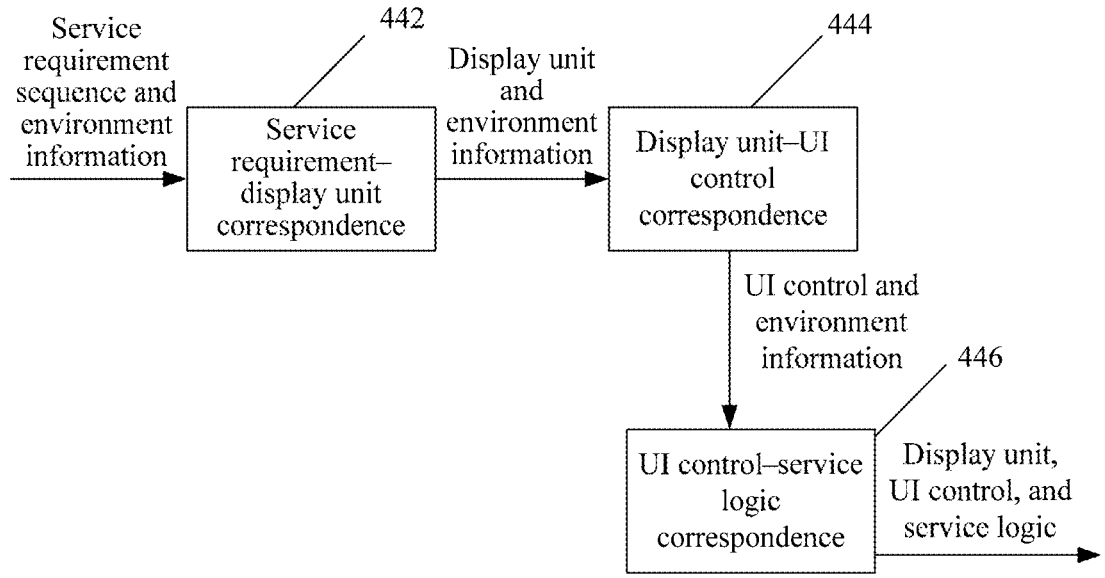
FIG. 6 is a schematic flowchart of an interface generation method according to an embodiment of this application.

A process of using the multi-level correspondence mentioned in step 440 is shown in FIG. 6.

Step 442. Search a service requirement-display unit correspondence based on the service requirement sequence (a single service/a multi-service combination), to find display units corresponding to the service requirement sequence, and determine, as a display unit for implementing the service requirement, a display unit that satisfies environment information among the display units corresponding to the service requirement sequence.

For example, the output display unit is an identity authentication display unit, a recharge-to-get-one-phone-free service information fill-in display unit, a main package change display unit, a card reissue type display unit, an old card information display unit, a new card information display unit, a card reissue information display unit, a print display unit, or the like.

For example, when added environment information is operator information, a display unit for identity authentication may be an identity authentication display unit related to an operator. For example, information covered by an identity authentication display unit related to an operator #1 is information such as an ID number, ID card information, and an address, and information covered by an identity authentication display unit related to an operator #2 is information such as an ID number, ID card information, an address, individual credit, and contact information.

For example, when added environment information is a mobile terminal, the display unit may be a display unit fit for display on the mobile terminal.

Step 444. Search a display unit-UI control correspondence to find UI controls corresponding to the display unit obtained in step 442, and determine, as a UI control for implementing the service requirement, a UI control that satisfies the environment information among the UI controls corresponding to the display unit obtained in step 442.

For example, the UI control for implementing the service requirement may be an ID type UIListView control, an ID number UIInput control, an authentication button, an effective type UIButton button, a card reissue type UIListView control, a clearing button, a print button, or the like.

For example, when added environment information is a mobile terminal, the UI control may be a UI control fit for display on the mobile terminal; when added environment information is data about a personal preference, the UI control is a UI control that matches the personal preference.

Step 446. Search a UI control-service logic correspondence to find service logics corresponding to the UI control obtained in step 444, and determine, as a service logic for implementing the service requirement, a service logic that satisfies the environment information among the service logics corresponding to the UI control obtained in step 444.

For example, the service logic for implementing the service requirement may be an ID authentication service logic, a package-change-effective-as-in-the-same-month service logic, a clearing service logic, a print service logic, or the like.

According to step 442, step 444, and step 446, a list of display units, a list of UI controls corresponding to the display units, and a list of service logics corresponding to the UI controls are generated, where these lists satisfy the service requirement (and may additionally satisfy the environment information) and are specifically an interface element information tree including "an ID list of display units, an ID list of UI controls included in each display unit, and an ID list of service logics corresponding to each UI control".

Step 450. Output the display units, the list of UI controls corresponding to the display units, and the list of service logics corresponding to the UI controls that are obtained in step 440 to an interface generator, where the interface generator obtains code from an interface element code library based on information provided by these lists, and combines the code to generate an interface. Specifically, the following operations may be included.

(1) Obtain implementation code of a corresponding UI control from a UI control library.

Further, a service database may be searched for corresponding service data. The service data is directly placed into a code area indicated by a service data identifier, in the UI control code, to form the UI control code. It should be understood that, the implementation code of the UI control itself may include service data, or a presented UI control itself does not have semantics.

(2) Obtain implementation code of a corresponding display unit from a display unit library.

(3) Place the implementation code of the UI control into the implementation code of the corresponding display unit.

(4) The interface generator obtains implementation code of a corresponding service logic from a service logic library, and places the implementation code into a service logic code area indicated by the implementation code of the UI control.

(5) The interface generator places, based on information provided by these lists and based on an orchestration template or a rule, for example, displaying display units in serial or displaying display units in parallel, the implementation code of the display unit to which the implementation code of the UI control and the implementation code of the service logic are added, into the orchestration template or blank page code.

Step 460. Send a complete HTML page that matches the service requirement and accompanying code to the browser for parsing and presentation.

Figure 7:
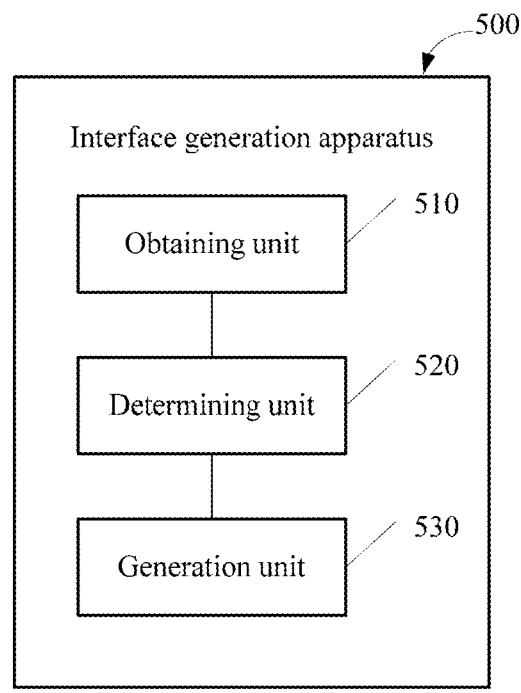
FIG. 7 is a schematic block diagram of an interface generation apparatus according to an embodiment of this application.

FIG. 7 is a schematic block diagram of an interface generation apparatus 500 according to an embodiment of this application. As shown in FIG. 7, the interface generation apparatus 500 includes an obtaining unit 510, a determining unit 520, and a generation unit 530.

The obtaining unit 510 is configured to obtain a service requirement of a user.

The determining unit 520 is configured to determine, based on the service requirement of the user, interface elements for implementing the service requirement and an association relationship between the interface elements for implementing the service requirement.

The generation unit 530 is configured to generate a user interface based on the interface elements for implementing the service requirement and the association relationship between the interface elements for implementing the service requirement.

Optionally, the interface elements for implementing the service requirement include a UI control for implementing the service requirement and a service logic for implementing the service requirement, and the association relationship between the interface elements for implementing the service requirement includes that each UI control for implementing the service requirement is associated with at least one service logic for implementing the service requirement; or the interface elements for implementing the service requirement include a display unit for implementing the service requirement, a UI control for implementing the service requirement, and a service logic for implementing the service requirement, and the association relationship between the interface elements for implementing the service requirement includes that each display unit for implementing the service requirement is associated with at least one UI control for implementing the service requirement, and that each UI control for implementing the service requirement is associated with at least one service logic for implementing the service requirement.

Optionally, the generation unit 530 is further configured to:
obtain implementation code of the interface elements for implementing the service requirement from an interface element code library; and
generate the user interface based on the implementation code of the interface elements for implementing the service requirement and the association relationship between the interface elements for implementing the service requirement.

Optionally, the generation unit 530 is further configured to:
obtain an interface generation template from a template library, where the interface generation template includes a background area and a blank area; and
write, into the blank area of the interface generation template, the implementation code of the interface elements for implementing the service requirement and the association relationship between the interface elements for implementing the service requirement, to generate the user interface.

Optionally, the obtaining unit 510 is further configured to:
obtain a service description entered by the user;
perform natural language analysis or statement similarity computation on the service description to obtain a keyword; and search a service requirement library based on the keyword to obtain the service requirement of the user.

Optionally, the determining unit 520 is specifically configured to:

determine, based on the service requirement of the user and a multi-level correspondence between a service requirement and at least two interface elements, the interface elements for implementing the service requirement from the at least two interface elements and the association relationship between the interface elements for implementing the service requirement.

Optionally, the determining unit 520 is specifically configured to:

determine, as an interface element for implementing the service requirement, an interface element that matches environment information of the user among interface elements indicated by the multi-level correspondence.

Optionally, the environment information of the user includes at least one of terminal device information, operator information, and user information of the user.

Optionally, the multi-level correspondence includes:
a service requirement-UI control correspondence and a UI control-service logic correspondence; or
a service requirement-display unit correspondence, a display unit-UI control correspondence, and a UI control-service logic correspondence.

It should be understood that, the interface generation apparatus 500 may be corresponding to the interface generation apparatus in the method embodiment, and may perform the corresponding operations of the interface generation apparatus in the method embodiment. For brevity, details are not repeated herein.

Figure 8:
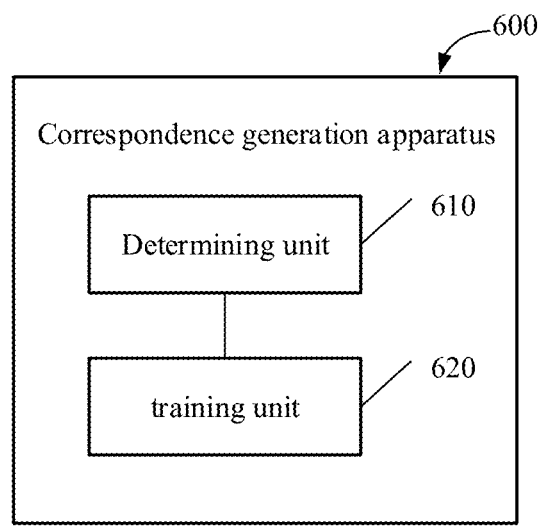
FIG. 8 is a schematic block diagram of a correspondence generation apparatus according to an embodiment of this application.

FIG. 8 is a schematic block diagram of a correspondence generation apparatus 600 according to an embodiment of this application. As shown in FIG. 8, the correspondence generation apparatus includes a determining unit 610 and a training unit 620.

The determining unit 610 is configured to determine sample data, where the sample data includes a plurality of service requirements, a plurality of interface elements, relationship data between each of the plurality of service requirements and at least one of the plurality of interface elements, and relationship data between the plurality of interface elements. The training unit 620 is configured to generate, based on the sample data, the multi-level correspondence through training.

Optionally, the determining unit 610 is further configured to: parse and analyze Hypertext Markup Language HTML statements of user interfaces of a plurality of web pages to determine the sample data; and/or determine the sample data based on an operation log of a service staff member.

It should be understood that, the correspondence generation apparatus 600 may be corresponding to the correspondence generation apparatus in the method embodiment, and may perform the corresponding operations of the correspondence generation apparatus in the method embodiment. For brevity, details are not repeated herein.

An embodiment of this application further provides a correspondence generation apparatus. The apparatus includes a memory and a processor. The memory is configured to store an instruction. The processor is configured to execute the instruction stored by the memory, and when the processor executes the instruction stored by the memory, this execution causes the processor to perform the corresponding operations of the correspondence generation apparatus in the method embodiment. For brevity, details are not repeated herein.

Figure 9:
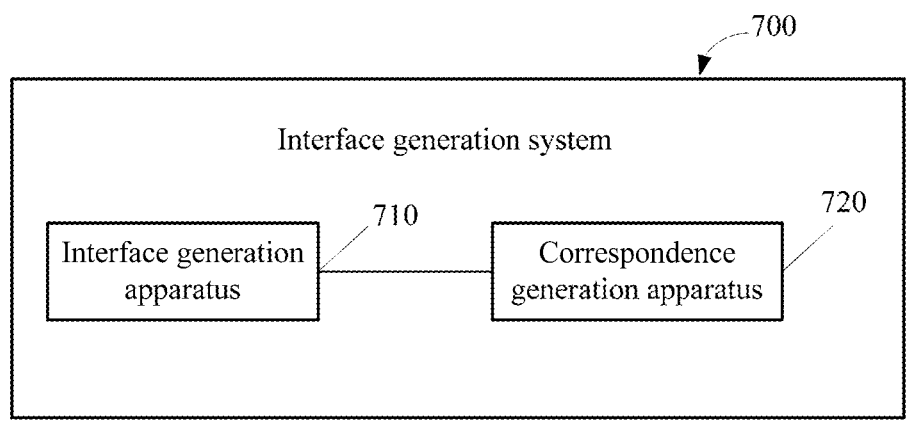
FIG. 9 is a schematic block diagram of an interface generation system according to an embodiment of this application.

FIG. 9 is a schematic block diagram of an interface generation system 700 according to an embodiment of this application. As shown in FIG. 9, the interface generation system 700 may include an interface generation apparatus 710 and a correspondence generation apparatus 720.

The interface generation apparatus 710 may be configured to perform the corresponding operations performed by the interface generation apparatus in the method embodiment. The correspondence generation apparatus 720 may be configured to implement the corresponding operations of the correspondence generation apparatus in the method embodiment.

A person of ordinary skill in the art may be aware that the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not repeated herein.

In the several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing description is merely specific implementation manners of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interface generation method, comprising:
   obtaining, by an interface generation apparatus, a service requirement of a user based on a service description entered by the user through a terminal device;
   determining, by the interface generation apparatus and based on the service requirement of the user and a service requirement-UI control correspondence, UI controls for implementing the service requirement, wherein the service requirement-UI control correspondence and a UI control-service logic correspondence are generated through training using a machine learning process;
   determining, by the interface generation apparatus and based on the UI controls for implementing the service requirement and the UI control-service logic correspondence, service logics for implementing the service requirement; and
   generating, by the interface generation apparatus, a user interface based on the UI controls for implementing the service requirement and the service logics for implementing the service requirement;
   wherein before determining, by the interface generation apparatus, the UI controls for implementing the service requirement and the service logics for implementing the service requirement, the method further comprises:
   determining, by a correspondence generation apparatus, sample data, wherein the sample data comprises a plurality of service requirements, a plurality of interface elements, relationship data between each of the plurality of service requirements and at least one of the plurality of interface elements, and relationship data between the plurality of interface elements, wherein the plurality of interface elements comprises the UI controls and the service logics, and wherein determining the sample data comprises at least one of:
   parsing and analyzing Hypertext Markup Language (HTML) statements of user interfaces of a plurality of web pages to determine the sample data; or
   determining the sample data based on an operation log of a service staff member; and
   generating, based on the sample data, the service requirement-UI control correspondence and the UI control-service logic correspondence.

2. The method according to claim 1, wherein determining the UI controls for implementing the service requirement comprises:
   determining, as a UI control for implementing the service requirement, a UI control that matches environment information of the user among UI controls indicated by the service requirement-UI control correspondence; and
   wherein determining the service logics for implementing the service requirement comprises:
   determining, as a service logic for implementing the service requirement, a service logic that matches environment information of the user among service logics indicated by the UI control-service logic correspondence.

3. The method according to claim 2, wherein the environment information of the user comprises at least one of terminal device information, operator information, and user information of the user.

4. The method according to claim 1, wherein obtaining, by the interface generation apparatus, the service requirement of the user comprises:
   obtaining the service description entered by the user;
   performing natural language analysis or statement similarity computation on the service description to obtain a keyword; and
   searching a service requirement library based on the keyword to obtain the service requirement of the user.

5. The method according to claim 1, wherein the generating a user interface comprises:
   obtaining implementation code of the UI controls for implementing the service requirement from a UI control code library, and implementation code of the service logics for implementing the service requirement from a service logic code library; and
   generating the user interface based on the implementation code of the UI controls for implementing the service requirement and the implementation code of the service logics for implementing the service requirement to generate the user interface.

6. The method according to claim 5, wherein the method further comprises:
   obtaining, by the interface generation apparatus, an interface generation template from a template library, wherein the interface generation template comprises a background area and a blank area; and
   wherein the generating a user interface comprises:
   writing, into the blank area of the interface generation template, the implementation code of the UI controls for implementing the service requirement and the implementation code of the service logics for implementing the service requirement to generate the user interface.

7. An interface generation apparatus, comprising:
   a memory configured to store an instruction;
   a receiver coupled to the memory; and
   at least one processor coupled to the memory and the receiver, the instruction causing the at least one processor to:
   obtain a service requirement of a user based on a service description entered by the user through a terminal device;
   determine, based on the service requirement of the user and a service requirement-UI control correspondence, UI controls for implementing the service requirement, wherein the service requirement-UI control correspondence and a UI control-service logic correspondence are generated through training using a machine learning process;
   determine, based on the UI controls for implementing the service requirement and the UI control-service logic correspondence, service logics for implementing the service requirement; and
   generate a user interface based on the UI controls for implementing the service requirement and the service logics for implementing the service requirement;

wherein before determining, by the interface generation apparatus, the UI controls for implementing the service requirement and the service logics for implementing the service requirement, a correspondence generation apparatus determines sample data and generates, based on the sample data, the service requirement-UI control correspondence and the UI control-service logic correspondence, wherein the sample data comprises a plurality of service requirements, a plurality of interface elements, relationship data between each of the plurality of service requirements and at least one of the plurality of interface elements, and relationship data between the plurality of interface elements, wherein the plurality of interface elements comprises the UI controls and the service logics, and wherein determining the sample data comprises at least one of:

parsing and analyzing Hypertext Markup Language (HTML) statements of user interfaces of a plurality of web pages to determine the sample data; or determining the sample data based on an operation loci of a service staff member.

8. The apparatus according to claim 7, wherein the instruction further causes the at least one processor to:
obtain the service description entered by the user;
perform natural language analysis or statement similarity computation on the service description to obtain a keyword; and
search a service requirement library based on the keyword to obtain the service requirement of the user.

9. The apparatus according to claim 7, wherein the instruction further causes the at least one processor to:
determine, as a UI control for implementing the service requirement, a UI control that matches environment information of the user among UI controls indicated by the service requirement-UI control correspondence; and
determine, as a service logic for implementing the service requirement, a service logic that matches environment information of the user among service logics indicated by the UI control-service logic correspondence.

10. The apparatus according to claim 7, wherein the generating a user interface comprises:
obtaining implementation code of the UI controls for implementing the service requirement from a UI control code library, and implementation code of the service logics for implementing the service requirement from a service logic code library; and
generating the user interface based on the implementation code of the UI controls for implementing the service requirement and the implementation code of the service logics for implementing the service requirement to generate the user interface.

11. The apparatus according to claim 10, wherein the instruction further causes the at least one processor to:
obtain an interface generation template from a template library, wherein the interface generation template comprises a background area and a blank area; and
wherein the generating a user interface comprises:
writing, into the blank area of the interface generation template, the implementation code of the UI controls for implementing the service requirement and the implementation code of the service logics for implementing the service requirement to generate the user interface.

12. An interface generation system, comprising:
an interface generation apparatus, the interface generation apparatus configured to:
obtain a service requirement of a user based on a service description entered by the user through a terminal device;
determine, based on the service requirement of the user and a service requirement-UI control correspondence, UI controls for implementing the service requirement;
determine, based on the UI controls for implementing the service requirement and a UI control-service logic correspondence, service logics for implementing the service requirement; and
generate a user interface based on the UI controls for implementing the service requirement and the service logics for implementing the service requirement; and
a correspondence generation apparatus, the correspondence generation apparatus configured to:
determine sample data, wherein the sample data comprises a plurality of service requirements, a plurality of interface elements, relationship data between each of the plurality of service requirements and at least one of the plurality of interface elements, and relationship data between the plurality of interface elements, wherein the plurality of interface elements comprises the UI controls and the service logics, and wherein determining the sample data comprises at least one of:
parsing and analyzing Hypertext Markup Language (HTML) statements of user interfaces of a plurality of web pages to determine the sample data; or
determining the sample data based on an operation loci of a service staff member; and
generate, based on the sample data, a service requirement-UI control correspondence and the UI control-service logic correspondence through training using a machine learning process.

13. The system according to claim 12, wherein the generating a user interface comprises:
obtaining implementation code of the UI controls for implementing the service requirement from a UI control code library, and implementation code of the service logics for implementing the service requirement from a service logic code library; and
generating the user interface based on the implementation code of the UI controls for implementing the service requirement and the implementation code of the service logics for implementing the service requirement to generate the user interface.

14. The apparatus according to claim 13, wherein the interface generation apparatus is further configured to:
obtain an interface generation template from a template library, wherein the interface generation template comprises a background area and a blank area; and
wherein the generating a user interface comprises:
writing, into the blank area of the interface generation template, the implementation code of the UI controls for implementing the service requirement and the implementation code of the service logics for implementing the service requirement to generate the user interface.

* * * * *